United States Patent
Watling et al.

(10) Patent No.: US 7,172,200 B2
(45) Date of Patent: Feb. 6, 2007

(54) SEALING ARRANGEMENT ON PISTON RODS

(75) Inventors: Simon Watling, Blyth (GB); Jon D. Leyland, Gateshead (GB); Yann Faschinetti, Newcastle upon Tyne (GB)

(73) Assignee: Carl Freudenberg KG (DE)

( * ) Notice: Subject to any disclaimer, the term of this patent is extended or adjusted under 35 U.S.C. 154(b) by 143 days.

(21) Appl. No.: 10/850,036

(22) Filed: May 20, 2004

(65) Prior Publication Data
US 2005/0013020 A1    Jan. 20, 2005

(30) Foreign Application Priority Data
May 21, 2003   (DE)  ................. 103 23 299

(51) Int. Cl.
  *B60T 11/236*  (2006.01)
  *B60B 9/18*  (2006.01)
(52) U.S. Cl. ........................ 277/434; 152/53
(58) Field of Classification Search ............. 152/53; 277/434
See application file for complete search history.

(56) References Cited

U.S. PATENT DOCUMENTS

| | | | | |
|---|---|---|---|---|
| 2,040,063 A | * | 5/1936 | Padgett | 188/315 |
| 2,595,878 A | * | 5/1952 | Parsons | 92/82 |
| 3,321,033 A | * | 5/1967 | Benuska et al. | 173/204 |
| 4,005,763 A | * | 2/1977 | Wallis | 184/24 |
| 4,076,103 A | * | 2/1978 | Wallis | 184/25 |
| 4,480,730 A | * | 11/1984 | Koller et al. | 188/315 |
| 4,792,128 A | * | 12/1988 | Holley | 267/118 |
| 5,086,691 A | * | 2/1992 | von Hatten | 92/83 |
| 5,197,718 A | * | 3/1993 | Wallis | 267/119 |
| 6,003,848 A | * | 12/1999 | Cotter et al. | 267/64.11 |

* cited by examiner

*Primary Examiner*—Patricia Engle
*Assistant Examiner*—Gilbert Lee
(74) *Attorney, Agent, or Firm*—Harness, Dickey & Pierce, P.L.C.

(57) ABSTRACT

A sealing arrangement on piston rods with a rod guided in a cylindrical compressed-gas space, particularly on piston rods of high-pressure pneumatic springs or gas-filled shock absorbers, with at least one seal disposed on the piston rod for sealing the compressed-gas space toward the outside, with a guide for the piston rod and with a lubricant space. The lubricant space is provided with an insert that is capable of absorbing the lubricant in sponge-like fashion.

13 Claims, 1 Drawing Sheet

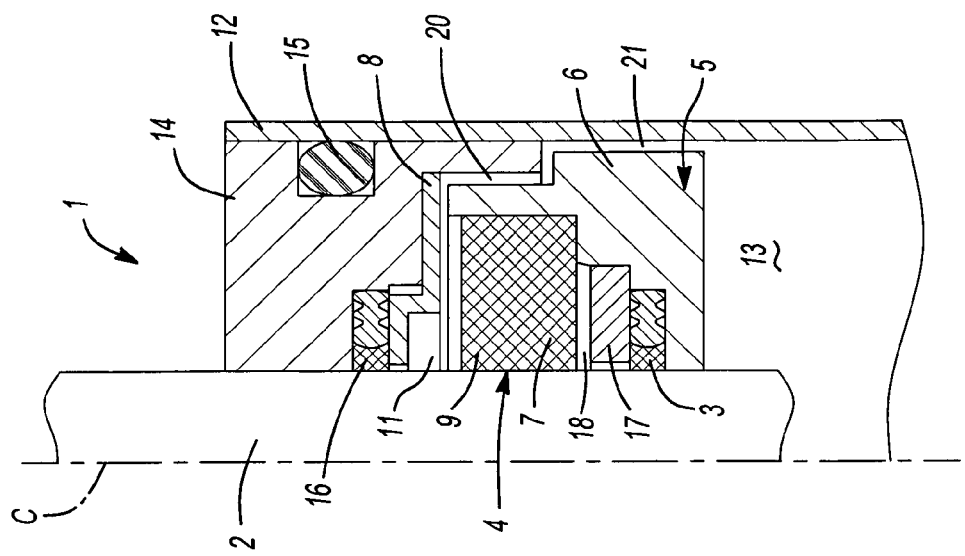
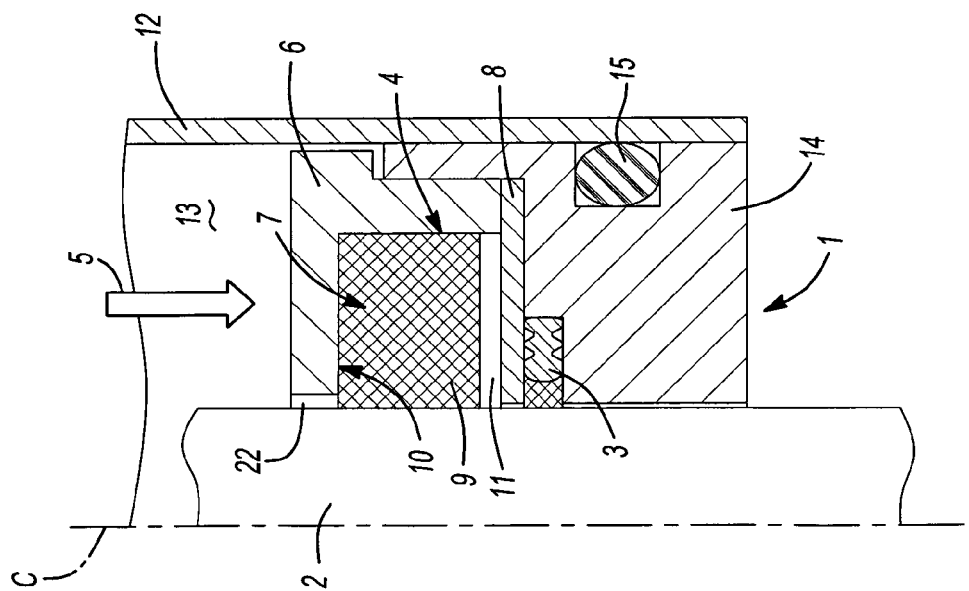

SEALING ARRANGEMENT ON PISTON RODS

CROSS-REFERENCE TO RELATED APPLICATIONS

This application claims the benefit of German Patent Application 103 23 299.0, filed May 21, 2003. The disclosure of the above application is incorporated herein by reference.

FIELD OF THE INVENTION

The present invention relates to a sealing arrangement on piston rods with a rod guided in a cylindrical compressed-gas space. Particularly, the present invention relates to a sealing arrangement on piston rods of high-pressure pneumatic springs or gas-filled shock absorbers, with at least one seal that is disposed on the piston rod for sealing the compressed-gas space toward the outside, with a guide for the piston rod and with a lubricant space.

BACKGROUND OF THE INVENTION

Utility Model G 88 06 642.8 U1 discloses a piston rod for a pneumatic spring in which the piston rod seal is disposed between an inner gas-filled space of a cylinder and an annular space filled with a lubricant. The configuration selected for this piston rod seal is such that the seal is readily fabricated and easily installed. The drawback of such shock absorbers, however, is their relatively high lubricant loss.

A comparable configuration of a compressed-gas spring is shown in DE 38 31 502 A1. To minimize permeation of gases through the seal, seal components having different permeation coefficients are used. This, however, does not prevent an excessive loss of oil during operation.

SUMMARY OF THE INVENTION

The present invention provides a sealing arrangement on piston rods whereby sufficient lubrication of the piston rod is achieved, but whereby attendant oil loss is reduced to a minimum.

To achieve sufficient lubrication of the piston rod, a spongy insert is introduced into the lubricant space such that the lubricant is retained by the insert. The piston rod brushing against the insert entrains only an amount of lubricant that is sufficient for the lubrication of the rod. In tests, such an insert achieved good results for a variety of different sealing arrangements on piston rods.

The insert is preferably made of a material of low density and large surface area, particularly of a non-woven fabric, which in turn consists predominantly of polymer fibers. The advantageous configuration of the lubricant space is achieved through a sleeve-like element centrally surrounding the piston rod. This element consists of a support and a cover closing off the internal space of the support.

In sealing arrangements in which the compressed-gas space is sealed by an internal seal that is, on the outside, oriented toward an outer seal on the outside of the lubricant space, an increased pressure can occur as a result of the pumping action of the internal seal in the lubricant space. To prevent this, the lubricant space and the compressed-gas space are connected through a channel. The channel provides pressure equilibrium. Advantageously, the channel is disposed on the outer wall of the support.

It should be noted that it is not necessary that the insert fill the entire lubricant space. Rather, it suffices if the insert occupies only part of the lubricant space. It is important, however, that the insert and the piston rod be in direct contact with each other and that the insert is kept in the lubricant space in a non-movable manner. Consequently, it is possible, for example, to use an insert which, axially on one side or both sides, is provided with a free space for the lubricant.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 1 shows, in longitudinal cross-section, the principle of the sealing arrangement according to the present invention with only an outer seal above which is disposed the lubricant space; and FIG. 2 shows, in longitudinal cross-section, a sealing arrangement according to a principle of the present invention with a lubricant space enclosed by an inner and an outer seal.

DETAILED DESCRIPTION OF THE PREFERRED EMBODIMENTS

The following description of the preferred embodiment(s) is merely exemplary in nature and is in no way intended to limit the invention, its application, or uses.

FIGS. 1 and 2 generally show partial cross-sections of sealing arrangements taken about a centerline C. In the sealing arrangement according to FIG. 1, a piston rod 2 is sealed by a sealing arrangement 1 that consists of an outer seal 3 and a lubricant space 4 disposed above it. The lubricant space 4 is formed by sleeve-like element 5 which centrally surrounds the piston rod 2 and which, in turn, consists of a support 6 and a cover 8 closing off the inner space 7 of the support. An insert 9 made of a non-woven material is introduced into the inner space 7 of the support. The insert 9 is pressed as far as the bottom 10 of support 6. After cover 8 is attached to the support 6, a free space 11 is formed between the cover 8 and the insert 9. The space contains, in addition to insert 9, a lubricant. Above element 5, and within cylinder 12, is located a compressed-gas space 13. Through channel 22, a lubricant space 4 is connected with the compressed-gas space 13. The channel 22 is formed by a groove in the edge of the support. Piston rod 2 is guided in a guide 14 which, in turn, takes up the outer seal 3 in a recess. The guide 14 is placed in cylinder 12. To prevent leakage of compressed-gases to the outside, there is provided a seal 15 which is directed toward the cylinder wall. The embodiment shown is particularly well suited for applications wherein the compressed-gas space 13 is located above the outer seal 3.

FIG. 2 shows, also in longitudinal cross-section, a sealing arrangement 1 that is of general use. The piston rod 2 is guided into the guide 14 which, in turn, is held in the cylinder 12. A seal 15 seals between the guide 14 and cylinder 12. Moreover, an outer seal 16 is disposed in the guide 14. This seal seals between the lubricant space 4 and the environment. The lubricant space 4 is limited by the piston rod 2 and an element 5. Here, too, the element 5 consists of a support 6 and a cover 8. An insert 9 is disposed in the inner space 7 of the support. The insert 9 consists of a large number of layers of non-vowen material disposed one above the other. An inner seal 3 present in the support 6 is held in the support 6 by a clamp collar 17. The outer seal 16 is pressed by the cover 8 into a corresponding recess provided on the guide 14.

In this example, as seen in the axial direction, free spaces 11 and 18 are provided for enhancing the uptake of the lubricant in the element 6. To prevent an undesirable excessive pressure from being generated in free spaces 11 and 18 as a result of the pumping action at the inner seal 3 caused by the movement of the piston rod 2, there is provided a channel 20 that connects the free space 11 and a compressed-gas space 13. This channel 20, in the form of a groove, runs along an outer wall 21 of the support 6. Below the cover 8, too, the groove 20 runs into the space 11 in the outer wall 21 of support 6.

The description of the invention is merely exemplary in nature and, thus, variations that do not depart from the gist of the invention are intended to be within the scope of the invention. Such variations are not to be regarded as a departure from the spirit and scope of the invention.

The invention claimed is:

1. A sealing arrangement on a piston rod with a rod guided in a cylindrically walled compressed-gas space, comprising:
    at least one seal disposed on the piston rod for sealing the compressed-gas space toward the cylinder wall; and
    a guide for the piston rod including a lubricant space, wherein said lubricant space is provided with an insert capable of absorbing a lubricant in sponge-like fashion, said lubricant space and the compressed-gas space connected to each other through a channel, and said channel being disposed on an outer wall of a support.

2. The sealing arrangement on a piston rod according to claim 1, wherein the insert comprises a material of a low density and a large surface area.

3. The sealing arrangement on a piston rod according to claim 2, wherein the insert comprises a non-woven material.

4. The sealing arrangement on a piston rod according to claim 1, wherein said lubricant space is limited by a sleeve-like element that centrally surrounds the piston rod.

5. The sealing arrangement on a piston rod according to claim 4, wherein the sleeve-like element comprises a support and a cover that closes an inner space of a support.

6. The sealing arrangement on a piston rod according to claim 1, wherein axially on one side or both sides of said insert there is provided a free space for said lubricant.

7. A sealing arrangement on a piston rod with a rod guided in a cylindrically walled compressed-gas space, comprising:
    at least one seal disposed on the piston rod for sealing the compressed-gas space toward the cylinder wall; and
    a guide for the piston rod including a lubricant space, wherein said lubricant space is provided with an insert capable of absorbing a lubricant in sponge-like fashion, said insert having a free space for said lubricant located axially on one side or both sides thereof.

8. The sealing arrangement on a piston rod according to claim 7, wherein the insert comprises a material of a low density and a large surface area.

9. The sealing arrangement on a piston rod according to claim 8, wherein the insert comprises a non-woven material.

10. The sealing arrangement on a piston rod according to claim 7, wherein said lubricant space is limited by a sleeve-like element that centrally surrounds the piston rod.

11. The sealing arrangement on a piston rod according to claim 10, wherein the sleeve-like element comprises a support and a cover that closes an inner space of a support.

12. The sealing arrangement on a piston rod according to claim 7, wherein said lubricant space and the compressed-gas space are connected to each other through a channel.

13. The sealing arrangement on a piston rod according to claim 7, wherein said channel is disposed on an outer wall of a support.

* * * * *